(12) United States Patent
Katsargyri et al.

(10) Patent No.: US 11,779,838 B1
(45) Date of Patent: Oct. 10, 2023

(54) APPARATUS AND METHOD FOR IDENTIFYING DIGITAL GAMING ACTIVITY BASED UPON ANONYMIZED KEYSTROKE DATA

(71) Applicant: Liminex, Inc., El Segundo, CA (US)

(72) Inventors: Georgia-Evangelia Katsargyri, Inglewood, CA (US); Lee Gregory Johnson, Issaquah, WA (US); Michael G. Frantz, Costa Mesa, CA (US); Kevin J. Wecht, Glendale, CA (US); Ryan T. Johnson, Marina Del Rey, CA (US)

(73) Assignee: LIMINEX, INC., El Segundo, CA (US)

( * ) Notice: Subject to any disclaimer, the term of this patent is extended or adjusted under 35 U.S.C. 154(b) by 0 days.

(21) Appl. No.: 17/400,941

(22) Filed: Aug. 12, 2021

(51) Int. Cl.
    *A63F 13/40* (2014.01)

(52) U.S. Cl.
    CPC .......... *A63F 13/40* (2014.09); *A63F 2300/10* (2013.01); *A63F 2300/535* (2013.01)

(58) Field of Classification Search
    CPC ................. A63F 13/40; A63F 2300/10; A63F 2300/535; G06F 3/023
    See application file for complete search history.

(56) References Cited

U.S. PATENT DOCUMENTS

| | | | |
|---|---|---|---|
| 6,442,692 B1 * | 8/2002 | Zilberman | G06F 21/316 |
| | | | 713/184 |
| 7,802,103 B2 * | 9/2010 | Bender | G06F 21/316 |
| | | | 726/19 |
| 10,693,661 B1 * | 6/2020 | Hamlet | G06F 21/31 |
| 11,079,856 B2 * | 8/2021 | Samzelius | G06F 21/316 |
| 11,100,201 B2 * | 8/2021 | Samzelius | G06F 21/316 |
| 11,324,093 B1 * | 5/2022 | Pruitt | H05B 47/155 |
| 2003/0088562 A1 * | 5/2003 | Dillon | G06F 16/951 |
| | | | 707/999.005 |
| 2006/0271790 A1 * | 11/2006 | Chen | G06V 40/10 |
| | | | 713/185 |
| 2008/0113787 A1 * | 5/2008 | Alderucci | G06F 21/32 |
| | | | 463/29 |
| 2009/0134972 A1 * | 5/2009 | Wu, Jr. | G06F 21/31 |
| | | | 340/5.82 |

(Continued)

FOREIGN PATENT DOCUMENTS

CH        715740 A2  *  7/2020  ........... G06F 21/316

OTHER PUBLICATIONS

"Keyboard and mouse operation based computer gaming state detection method," by Fei Chen and Jinliang Yao of Hangzhou Dianzi University. Published in AIIPCC Jun. 26-28, 2021 (Year: 2021).*

(Continued)

*Primary Examiner* — Steven J Hylinski
(74) *Attorney, Agent, or Firm* — Cooley LLP

(57) ABSTRACT

A non-transitory computer readable storage medium has instructions executed by a processor to collect keystroke data of a user for a designated time period. A number of distinct keys is derived from the keystroke data. A maximum character frequency is derived from the keystroke data. Digital gaming activity is selectively designated based upon the number of distinct keys and the maximum character frequency.

8 Claims, 2 Drawing Sheets

(56) References Cited

U.S. PATENT DOCUMENTS

| | | | |
|---|---|---|---|
| 2012/0098750 A1* | 4/2012 | Allen | G06F 21/316 345/169 |
| 2012/0174236 A1* | 7/2012 | Goodwin | G06F 21/6263 726/27 |
| 2014/0280341 A1* | 9/2014 | Rafei | G06F 16/24 707/776 |
| 2015/0196844 A1* | 7/2015 | Liendo | A63F 13/79 463/43 |
| 2018/0260036 A1* | 9/2018 | Lee | H01H 13/83 |

OTHER PUBLICATIONS

"Recognition of Human Computer Operations Based on Keystroke Sensing by Smartphone Microphone," by Zhiwen Yu, He Du, Dong Xiao, Zhu Wang, Qi Han, and Bin Guo, published in IEEE Internet of Things Journal, vol. 5, No. 2, Apr. 2018. (Year: 2018).*

"How do you detect keystrokes in video games with Python?" by Dharman, last edited Nov. 7, 2020. source: https://stackoverflow.com/questions/64724760/how-do-you-detect-keystrokes-in-video-games-with-python (Year: 2020).*

* cited by examiner

APPARATUS AND METHOD FOR IDENTIFYING DIGITAL GAMING ACTIVITY BASED UPON ANONYMIZED KEYSTROKE DATA

FIELD OF THE INVENTION

This invention relates generally to the identification of a digital machine partaking in digital gaming. More particularly, this invention is directed toward identifying digital gaming activity based upon anonymized keystroke data.

BACKGROUND OF THE INVENTION

Computers are integral to an educational environment. The educational environment is compromised when computers are used for digital gaming. Thus, there is a need to identify digital gaming activity. Such activity should be identified without comprising student privacy.

SUMMARY OF THE INVENTION

A non-transitory computer readable storage medium has instructions executed by a processor to collect keystroke data of a user for a designated time period. A number of distinct keys is derived from the keystroke data. A maximum character frequency is derived from the keystroke data. Digital gaming activity is selectively designated based upon the number of distinct keys and the maximum character frequency.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
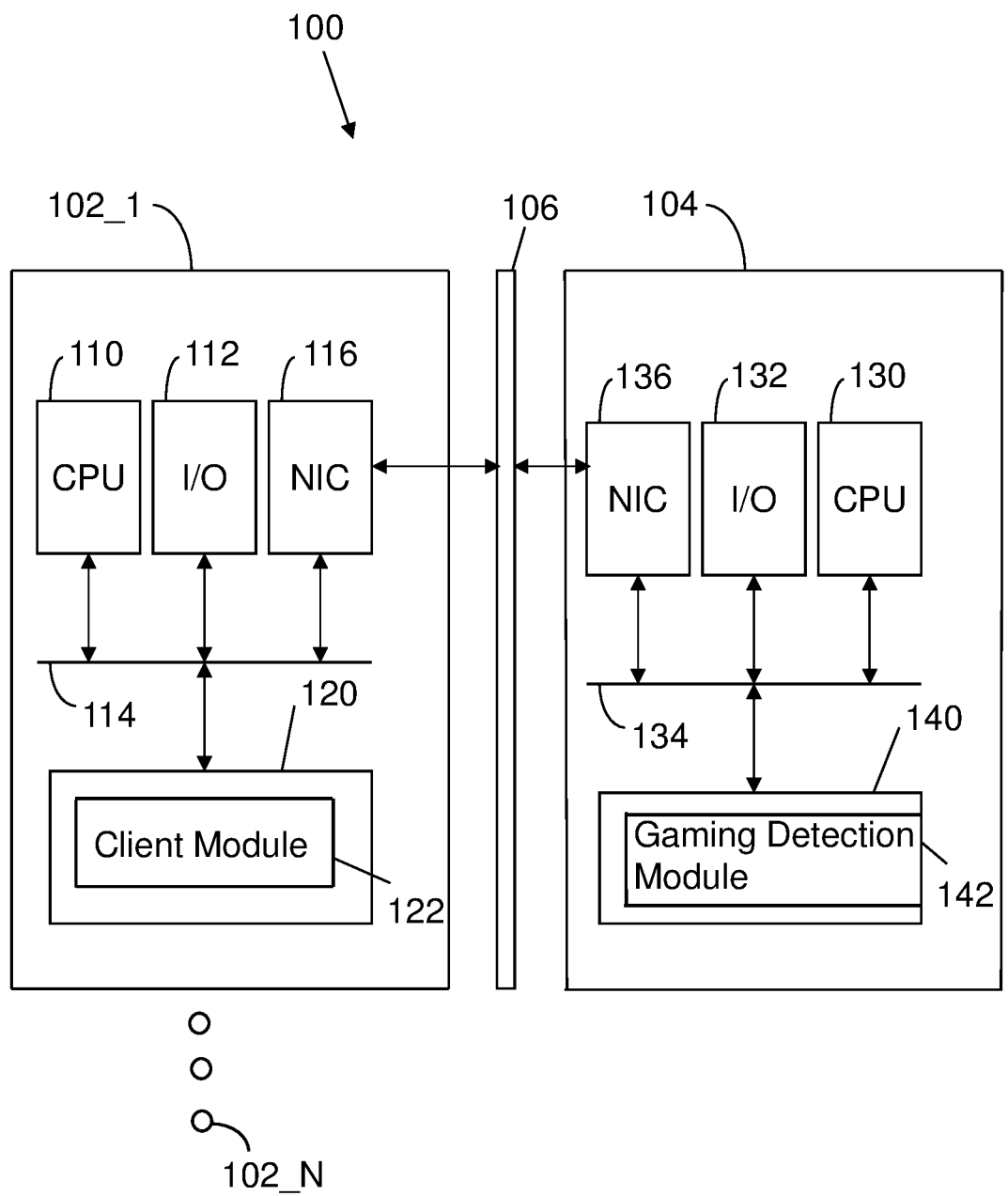
FIG. 1 illustrates a system configured in accordance with an embodiment of the invention.

FIG. 1 illustrates a system 100 configured in accordance with an embodiment of the invention. The system 100 includes a set of client devices 102_1 through 102_N in communication with a server 104 via a network 106, which may be any combination of wired and wireless networks. The client devices 102_1 through 102_N may be computers, tablets, mobile devices and the like. By way of example, client device 102_1 includes a processor 110 (e.g., a central processing unit) in communication with input/output devices 112 via a bus 114. The input/output devices 112 may include input devices, such as a keyboard, mouse, touch display and the like. The output devices include at least one display. A network interface circuit 116 is also connected to bus 114 to provide connectivity to network 106. A memory 120 is also connected to the bus 114. The memory 120 stores a client module 122 with instructions executed by processor 110 to collect keystroke activity. The client module 122 may include educational content.

Server 104 includes a processor 130, input/output devices 132, bus 134 and network interface circuit 136. A memory 140 is connected to bus 134. The memory 140 stores a gaming detection module 142 with instructions executed by processor 130 to implement operations disclosed herein. The gaming detection module 142 may be installed on any one of client devices 102_1 through 102_N. The invention is disclosed in the context of a client-server environment by way of example, not by way of limitation.

Figure 2:
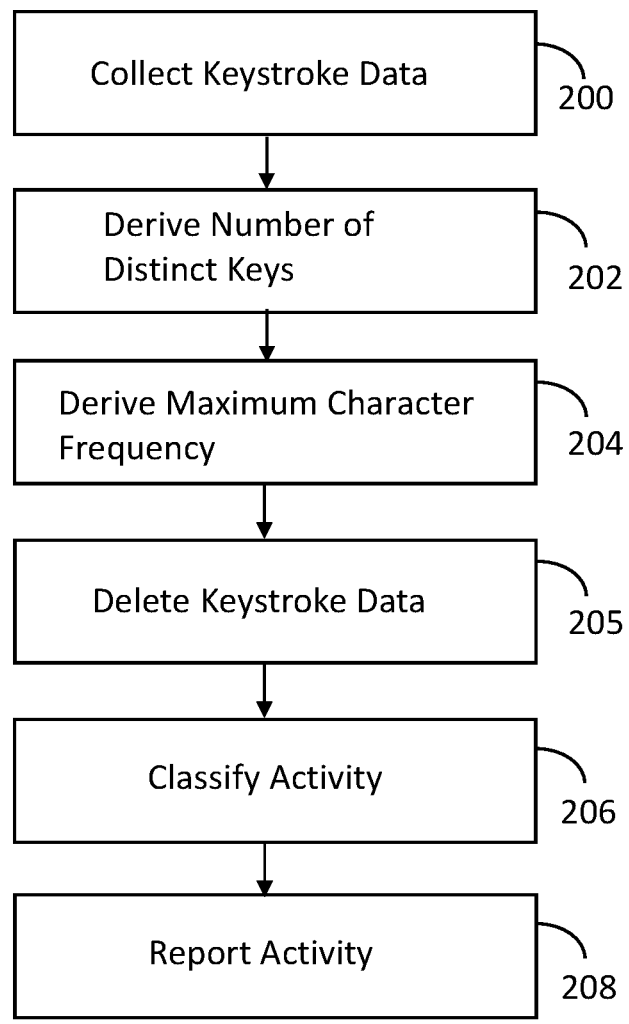
FIG. 2 illustrates processing operations associated with an embodiment of the invention.

FIG. 2 illustrates operations implemented by the gaming detection module 142. Keystroke data is collected 200. By way of example, the keystroke data is collected in one minute time periods. The number of distinct keys is then derived 202. A maximum character frequency is then derived 204. Keystroke data is then deleted 205.

The keystroke activity is then classified 206 based upon the number of distinct keys and the maximum character frequency (not the original keystroke data, which is deleted). In one embodiment, the keystroke activity is classified as gaming activity, suspicious activity or non-gaming activity. The classified activity may then be reported 208. For example, student user activity on client device 102_1 may be tracked by the gaming detection module 142 and selectively identified gaming activity may be reported by the gaming detection module 142 to a teacher utilizing client device 102_N.

Observe that the invention evaluates behavioral data to classify user activity instead of evaluating webpage content. Further observe that keystroke activity is abstracted in an aggregation that transforms raw data into a few summarizing features. This eliminates privacy risks, while preserving the predictive value of the data.

Consider the following sequence of keystrokes: w, s, d, d, s, w, d, a, w, s, d, w, a, s, d, d. This corresponds to the collect keystroke data operation 200 of FIG. 2. The number of distinct keys is then derived, which is operation 202 of FIG. 2. In this case there are four distinct characters: w, s, d and a. The maximum character frequency is derived, which is operation 204 of FIG. 2. In this case, character frequency is: w: 4/16=25%, s: 4/16=25%, d: 6/16=37.5% and a: 2/16=12.5%. Therefore, the maximum character frequency is 37.5%. The gaming detection module 142 is configured to only persistently store the number of distinct keys, in this case 4 and the maximum character frequency, in this case 37.5%. The actual keystroke data is deleted after the distinct key and maximum character frequency measures are derived, as shown with operation 205 of FIG. 2. The activity is classified based upon these two measures. The activity may be analyzed by a rule base or a trained machine learning module. In general, ten or fewer distinct characters is likely to represent gaming activity. A maximum character frequency above 20% is likely to represent gaming activity. The system may be configured to require a minimum threshold number of keystrokes for a designate time period. If the minimum threshold is not met, the activity can be designated as non-gaming.

This example demonstrates how information is abstracted to preserve privacy, yet strong measures are still used to identify gaming activity. A similar approach may be applied to mouse activity, where the exact mouse motion is aggregated into general motion trends.

The classification of activity may be supplemented with additional information, such as a whitelist of permitted web pages, a blacklist of prohibited web pages, web page text analysis, web page image analysis and the like. However, such additional information sources are not necessary in view of the strong performance obtained through the anonymized data processed in accordance with the disclosed technique.

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A non-transitory computer readable storage medium with instructions executed by a processor to:

collect keystroke data of a user for a designated time period;

derive a number of distinct keys from the keystroke data;

derive a maximum character frequency from the keystroke data;

delete the keystroke data;

persistently store the number of distinct keys and maximum character frequency to form anonymized keystroke data; and selectively classify digital gaming activity based upon the anonymized keystroke data, where digital gaming activity is designated when there are ten or fewer distinct keys or the maximum character frequency is above 20%.

2. The non-transitory computer readable storage medium of claim 1 wherein the instructions executed by the processor to selectively classify digital gaming activity utilizes a trained machine learning model.

3. The non-transitory computer readable storage medium of claim 1 wherein the instructions executed by the processor to selectively classify digital gaming activity utilizes a rule base.

4. The non-transitory computer readable storage medium of claim 1 wherein the instructions executed by the processor to selectively classify digital gaming activity utilizes a whitelist of permitted web pages.

5. The non-transitory computer readable storage medium of claim 1 wherein the instructions executed by the processor to selectively classify digital gaming activity utilizes a blacklist of prohibited web pages.

6. The non-transitory computer readable storage medium of claim 1 wherein the instructions executed by the processor to selectively classify digital gaming activity utilizes web page text analysis.

7. The non-transitory computer readable storage medium of claim 1 wherein the instructions executed by the processor to selectively classify digital gaming activity utilizes web page image analysis.

8. The non-transitory computer readable storage medium of claim 1 further comprising instructions executed by the processor to report the digital gaming activity.

* * * * *